(12) United States Patent
Lavertu et al.

(10) Patent No.: US 12,404,801 B2
(45) Date of Patent: Sep. 2, 2025

(54) METHODS AND SYSTEMS FOR TURBOCHARGER

(71) Applicant: Transportation IP Holdings, LLC, Norwalk, CT (US)

(72) Inventors: Thomas Lavertu, Ballston Lake, NY (US); Adam Klingbeil, Ballston Lake, NY (US); James Mischler, Lawrence Park, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/662,770

(22) Filed: May 13, 2024

(65) Prior Publication Data

US 2024/0418119 A1 Dec. 19, 2024

Related U.S. Application Data

(63) Continuation of application No. 18/155,018, filed on Jan. 16, 2023, now Pat. No. 11,982,223.
(Continued)

(51) Int. Cl.
| | |
|---|---|
| *F02B 37/24* | (2006.01) |
| *B60L 3/10* | (2006.01) |
| *B60W 30/18* | (2012.01) |
| *F02B 37/10* | (2006.01) |
| *F02B 37/14* | (2006.01) |
| *F02B 37/18* | (2006.01) |
| *F02B 39/10* | (2006.01) |
| *F02B 63/04* | (2006.01) |
| *F02D 23/00* | (2006.01) |
| *F02D 28/00* | (2006.01) |

(Continued)

(52) U.S. Cl.
CPC ........... *F02B 37/24* (2013.01); *B60L 3/106* (2013.01); *B60W 30/18172* (2013.01); *F02B 37/10* (2013.01); *F02B 37/14* (2013.01); *F02B 37/18* (2013.01); *F02B 39/10* (2013.01); *F02B 63/04* (2013.01); *F02D 23/00* (2013.01); *F02D 28/00* (2013.01); *F02D 41/0007* (2013.01); *F02B 2037/122* (2013.01); *F02D 29/02* (2013.01); *F02D 2200/10* (2013.01); *F02D 2200/50* (2013.01)

(58) Field of Classification Search
CPC .... F02B 37/10; F02B 2037/122; F02B 37/14; F02B 37/18; F02B 37/24; F02B 39/10; F02B 63/04; B60L 3/106; B60W 30/18172; F02D 23/00; F02D 28/00; F02D 29/02; F02D 41/0007; F02D 2200/10; F02D 2200/50
See application file for complete search history.

(56) References Cited

U.S. PATENT DOCUMENTS

| | | | |
|---|---|---|---|
| 4,955,199 A | 9/1990 | Kawamura | |
| 5,899,069 A * | 5/1999 | Watanabe | ............ F02B 37/18 60/602 |

(Continued)

*Primary Examiner* — Loren C Edwards
(74) *Attorney, Agent, or Firm* — K&L Gates LLP

(57) ABSTRACT

Methods and systems are provided for a turbocharger. In one example, a method includes adjusting one or more of a wastegate position and a position of vanes with operation of a turbocharger to reach a desired turbocharger speed via a controller. The method further includes adjusting engine operating parameters to reach the desired turbocharger speed.

15 Claims, 5 Drawing Sheets

Related U.S. Application Data

(60) Provisional application No. 63/267,402, filed on Feb. 1, 2022.

(51) Int. Cl.
*F02D 41/00* (2006.01)
*F02B 37/12* (2006.01)
*F02D 29/02* (2006.01)

(56) References Cited

U.S. PATENT DOCUMENTS

| | | |
|---|---|---|
| 6,652,414 B1 | 11/2003 | Banks, III |
| 6,925,804 B2 | 8/2005 | Longnecker et al. |
| 8,191,371 B2 | 6/2012 | Kley et al. |
| 10,280,850 B1 | 5/2019 | Zeng et al. |
| 11,982,223 B2 | 5/2024 | Lavertu et al. |
| 2009/0198432 A1* | 8/2009 | Tabata .................. F02D 23/02 701/103 |
| 2009/0222188 A1* | 9/2009 | Igarashi .............. F02D 41/0007 701/102 |
| 2011/0000461 A1* | 1/2011 | Fransson ............... F01D 17/165 123/323 |
| 2013/0340430 A1 | 12/2013 | Peters et al. |
| 2017/0089278 A1* | 3/2017 | Tulapurkar ............ F02D 35/027 |
| 2019/0063348 A1* | 2/2019 | Xiao ..................... F02D 11/105 |
| 2019/0106130 A1* | 4/2019 | Pocha Siva Sankara .................. B61D 43/00 |
| 2023/0243294 A1 | 8/2023 | Lavertu |

\* cited by examiner

METHODS AND SYSTEMS FOR TURBOCHARGER

CROSS-REFERENCE TO RELATED APPLICATIONS

The present application is a continuation application claiming priority under 35 U.S.C. § 120 to U.S. patent application Ser. No. 18/155,018, entitled METHODS AND SYSTEMS FOR TURBOCHARGER, filed Jan. 16, 2023, which claims benefit under 35 U.S.C. § 119 (e) to U.S. Provisional Application No. 63/267,402, entitled METHODS AND SYSTEMS FOR TURBOCHARGER, and filed on Feb. 1, 2022. The entire contents of the above-listed applications are hereby incorporated by reference for all purposes.

TECHNICAL FIELD

Embodiments of the subject matter disclosed herein relate to turbocharged internal combustion engines, and more specifically, to adjusting a position of a wastegate during conditions to increase an engine power output without increasing a turbo speed.

DISCUSSION OF ART

Some vehicles with an internal combustion engine (also referred to simply as the engine) may use a turbocharger. One type of turbocharger is an e-turbo. The e-turbo differs from a regular turbocharger in that it may selectively extract excess energy from the exhaust for electrical power or provide additional energy to the compressor through the electric motor. An exhaust gas flow may power a compressor, via spinning the turbine, to provide compressed air to one or more cylinders of the engine. Compressing air in this manner may increase a power and torque of the engine. It may be desirable to have a system and method that differs from those that are currently available.

BRIEF DESCRIPTION

In one embodiment, the current disclosure provides support for a system including an engine, an electric motor, and a turbocharger including a wastegate. A controller with computer-readable instructions stored on non-transitory memory thereof that when executed enable the controller to adjust a combination of the turbocharger and the wastegate to reach a determined parameter.

In another embodiment, the current disclosure further provides support for a method including adjusting one or more of a wastegate position and a position of vanes with operation of a turbocharger to reach a determined turbocharger speed via a controller.

In a further embodiment, the current disclosure further provides support for a system of a vehicle including an engine coupled to a turbocharger, an electric motor coupled to a shaft of the turbocharger, and a controller with computer-readable instructions stored on non-transitory memory thereof that when executed cause the controller to adjust one or more of a wastegate position and a position of vanes with operation of a turbocharger to reach a determined turbocharger speed in response to one or more of a track speed being less than a lower threshold, the track speed being greater than an upper threshold, traction loss occurring, and a turbocharger speed exceeding a limit speed.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

This description and embodiments of the subject matter disclosed herein relate to methods and systems for changing performance of an internal combustion engine (ICE). The ICE may be couple to a turbocharger. The turbocharger may be an electric turbocharger, which may be selectively driven via a combination of an electric machine and exhaust gas. Herein, the electric turbocharger is referred to as an e-turbo. Operation of the engine, e-turbo, and wastegate/vanes may be modified and controlled to achieve a determined operating parameter, such as a determined turbocharger speed.

Figure 1:
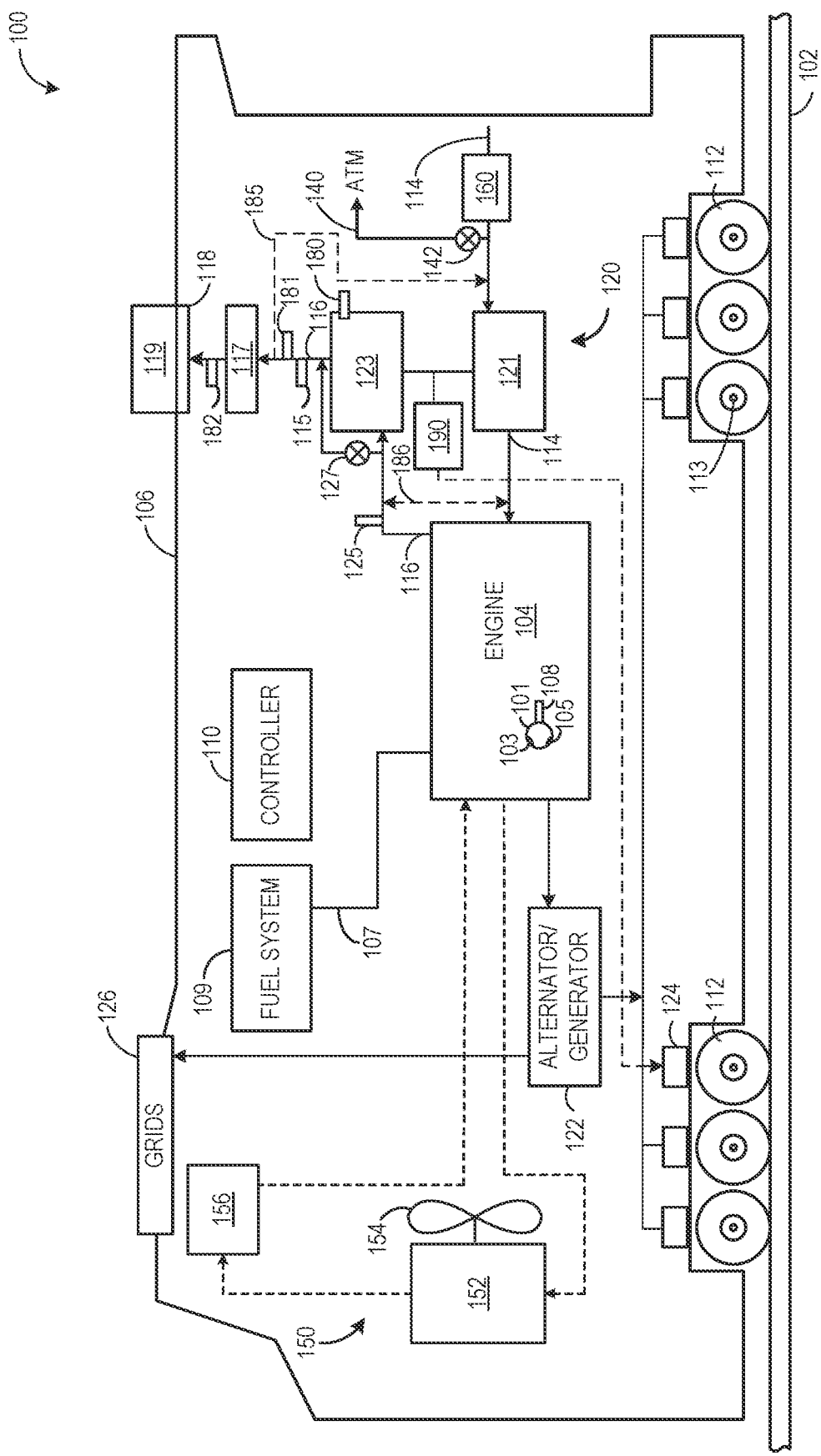
FIG. 1 shows a schematic diagram of a vehicle system with an engine, according to an embodiment of the present disclosure.
Figure 2:
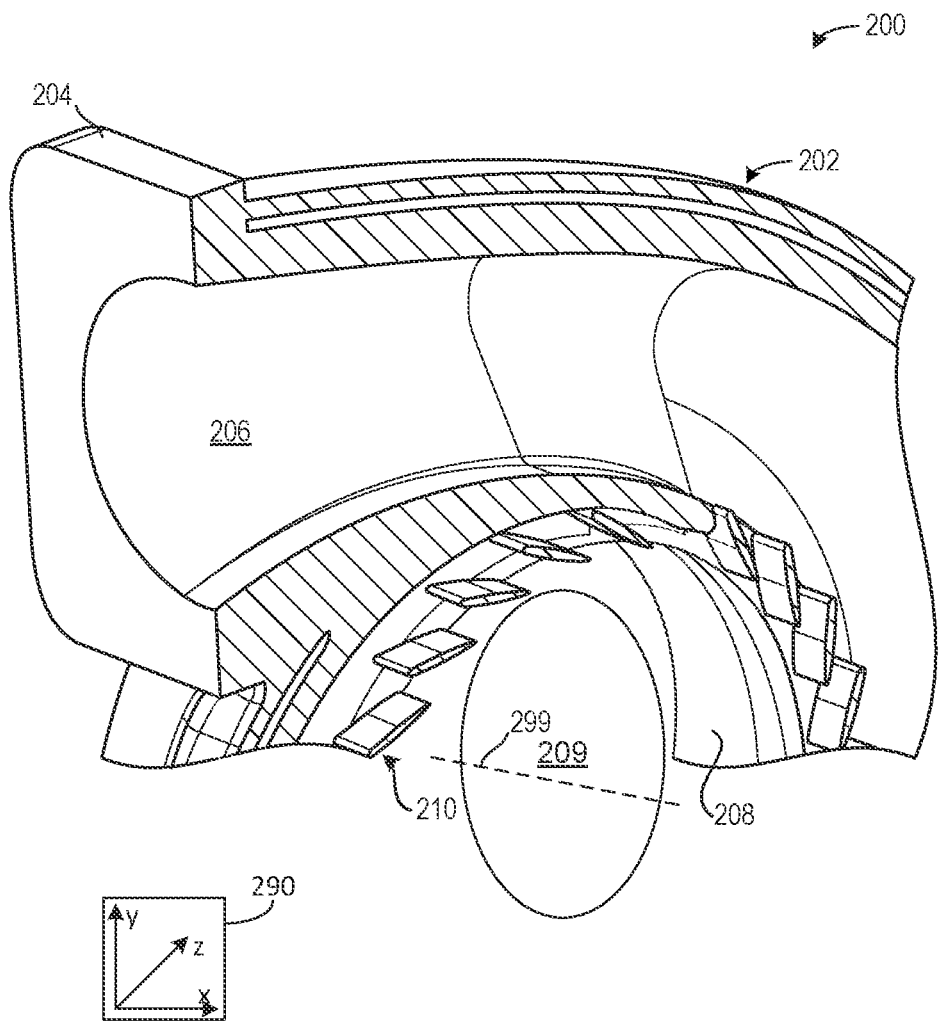
FIG. 2 shows an embodiment of a variable geometry turbine.
Figure 3A:
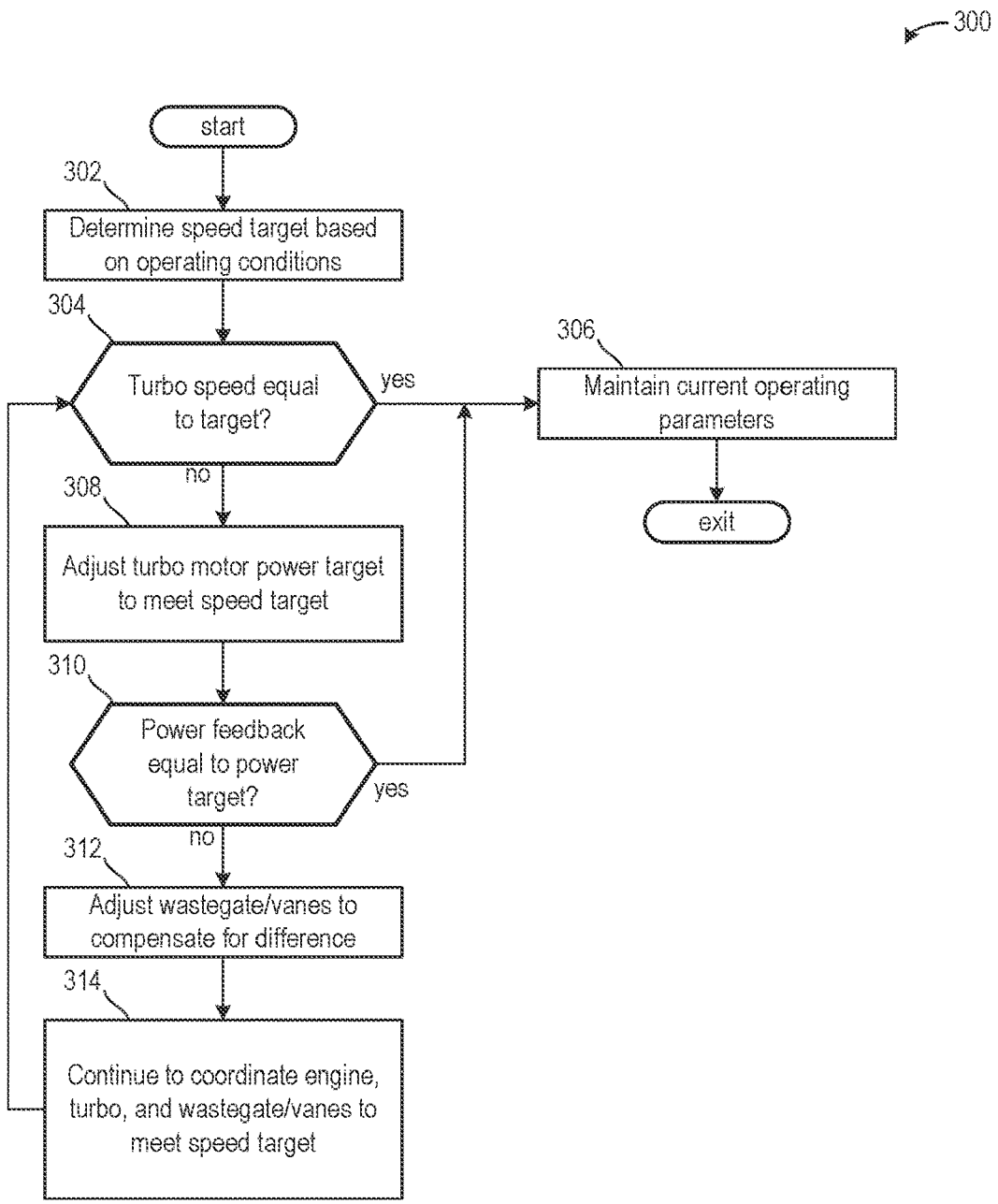
FIG. 3A shows a high-level method for adjusting turbocharger operation based on a determined parameter.

FIG. 1 illustrates an example of a vehicle system that includes an engine, an e-turbo, an aftertreatment system, a fuel system and a control system. FIG. 2 shows an embodiment of a variable geometry turbine. A controller of the vehicle system may use a plurality of different control strategies to adjust a speed of e-turbo based on determined substitution rates, as shown in the methods of FIGS. 3A and 4 and the control diagram of FIG. 3B.

Embodiments of the disclosure are disclosed in the following description, and may relate to methods and systems for a multi-fuel system of an internal combustion engine (ICE) comprising the e-turbo. The ICE may operate via a combination of different fuels. These fuels may have relatively different amounts of carbon. In one example, the ICE may be a multi-fuel engine configured to combust a plurality of fuels. Each of the plurality of fuels may be stored in separate fuel tanks. In one embodiment, one or more of the fuels and its corresponding fuel tank may be housed in a different fuel tank including a different fuel. In one example, a gaseous fuel tank comprising a gaseous fuel may be arranged within an interior volume of a liquid fuel tank comprising a liquid fuel.

The ICE may combust one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels, liquid fuels, and solid fuels, alone or in combination. A substitution rate of a primary fuel of the ICE with a secondary fuel may be determined based on a current engine load. In one embodiment, the substitution rate may correspond to an injection amount of a fuel with a relatively lower carbon content or zero carbon content (e.g., hydrogen gas or ammonia). As the substitution rate increases, the relative proportion of fuel with the lower or zero carbon content increases and the overall amount of carbon content in the combined fuel lowers. Additionally or alternatively, the substitution rate may correspond to an injection amount or delivery of a gaseous fuel relative to a liquid fuel.

In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to promote enhanced combustion of the hydrogen. The engine system may be further configured to combust a mixture of three or more fuels including diesel, hydrogen, and ammonia. Additionally or alternatively, ethanol may be included in the combustion mixture.

In one example, systems and methods for the multi-fuel engine may include combusting a primary fuel in combination with one or more secondary fuels. The multi-fuel engine may be configured to combust the primary fuel alone. During some conditions, the multi-fuel engine may be configured to decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn rate. An ignition timing of the multi-fuel engine may be adjusted in response to the combustion mixture to account for inclusion of the secondary fuels. For example, the ignition timing may be retarded as an amount of hydrogen is increased. As another example, the ignition timing may be advanced as an amount of ammonia is increased. The ignition timing may be further adjusted in this way in response to addition and subtraction of the primary and one or more secondary fuels to the combustion mixture. By doing this, knock and pre-combustion may be mitigated.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive may be provided as an example of a mobile platform. In one example, a vehicle system may include an engine, a turbocharger, an aftertreatment system, a fuel system, and a control system.

In some examples, the substitution rate of the ICE may be adjusted in response to parameters of the e-turbo. For example, if a turbocharger speed is limited due to a power extractable by the e-turbo is less than a threshold, then the substitution rate may be adjusted. Additionally or alternatively, if a wastegate of a turbine is opened or closed, then the substitution rate may be adjusted.

Referring to FIG. 1, a block diagram of an embodiment of a vehicle system 100 having an engine system is shown. The vehicle system includes a vehicle 106. In the illustrated embodiment, the vehicle is a rail vehicle (e.g., a locomotive) that may operate on a rail 102 via a plurality of wheels 112 mounted on axles 113. In another embodiment, the engine system may be disposed in another type of vehicle, such as an automobile, marine vessel, or a truck. In still other embodiments, the vehicle system may include mining equipment, agricultural equipment, industrial equipment, or any other equipment that relies on tractive effort generated by a combination of one or more engines and one or more motors.

The vehicle system includes an engine 104. The engine may include a plurality of cylinders, including the cylinder 101. The plurality of cylinders may each include at least one intake valve 103, at least one exhaust valve 105, and injectors 108. Each fuel injector may include an actuator that may be actuated via a signal from a controller 110 of the engine. The cylinders of the engine may receive fuel from a fuel system 109 via a fuel conduit 107. In some examples, the fuel conduit may be coupled with a common fuel rail and the plurality of injectors. The engine may be spark-ignited or spark-free. In some examples, additionally or alternatively, the engine may combust multiple fuels including at least a first fuel and a second fuel. The first and second fuels may include gasoline, diesel, hydrogenation-derived renewable diesel (HDRD), alcohol(s), ethers, ammonia, biodiesels, hydrogen, natural gas, kerosene, syn-gas, cryogenic liquids, and the like.

During operation, each cylinder within the engine may use a four stroke cycle. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 116 via the exhaust port. Exhaust gas flows through the exhaust passage, to a muffler 118, and out of an exhaust stack 119 of the vehicle.

In one example, the vehicle is a diesel-electric vehicle, where the engine may be coupled to an electric power generation system, including an alternator/generator 122 and electric traction motors 124. The alternator/generator may additionally include a direct current (DC) generator. In other examples, the engine may be a diesel engine, a gasoline engine, a biodiesel engine, an alcohol or hydrogen engine, a natural gas engine (spark or compression ignition), or a combination of two or more of the foregoing that generates a torque output during operation. The torque output may be transmitted to the electric generator or alternator through a mechanical coupling from the engine. As depicted herein, six pairs of traction motors correspond to each of six pairs of motive wheels of the vehicle. In another example, alternator/generator may be coupled to one or more resistive grids 126 or an energy storage device. The resistive grids may dissipate as heat the electricity generated by traction motors in dynamic braking mode. The energy storage device may be used to capture dynamic braking energy, or energy from the generator directly, or energy from any one of a number of selectively coupleable sources of electricity. (and conversely may pay out energy as may be useful).

The vehicle system may include a turbocharger 120 that may be arranged between the intake passage and the exhaust passage. The turbocharger increases air charge of ambient air drawn into the intake passage in order to provide greater charge density during combustion to increase power output and/or engine-operating efficiency. The turbocharger may include a compressor 121 (disposed in the intake passage) which may be at least partially driven by a turbine 123 (disposed in the exhaust passage). The turbine may be a fixed geometry turbine, or the turbine may be a variable geometry turbine, where a variable vane control adjusts a position of variable geometry turbine vanes. Another suitable turbine may be a variable fluidic turbocharger, in which gas is forced through apertures in the vanes so as to controllably modify the performance. Exhaust gases may pass through the turbine supplying less energy to rotate the turbine when vanes are in an open position, while exhaust gases may pass through the turbine and impart increased energy on the turbine when vanes are in a closed position. As the turbine rotates, heat and kinetic energy in the exhaust gases may be converted into mechanical energy, which may be used to drive the compressor of the turbocharger to deliver compressed air to the engine intake (e.g., to provide a pressure boost to cylinders of the engine based on engine operating conditions). While a single turbocharger is included in FIG. 1, the system may include multiple turbine and/or compressor stages. The turbine may include a turbine speed sensor 180, and a turbine inlet temperature sensor 125 may be positioned in the exhaust passage, upstream of an inlet of the turbine.

In another embodiment, the turbocharger may be an e-turbo, where an electrical machine 190 mechanically coupled to the turbine may convert the mechanical energy into electrical energy. The e-turbo may be integrated into a shaft of the turbocharger, where the compressor and the turbine are mechanically linked. The e-turbo may be operated as a motor/generator that can be used to motor the shaft (e.g., speed it up) to increase a work output of the compressor or slow the shaft down to extract excess energy. While operating in a generating mode, extracting the excess exhaust energy may result in improved overall engine efficiency. While operating in a motoring mode, the compressor may provide additional airflow to the engine, which may improve combustion and/or emissions of the vehicle. Additionally, the electrical energy may be used to power one or more accessory devices of the vehicle, such as an electric motor, and/or stored in an energy storage device (e.g., a battery, capacitor bank, or electro-chemical converter). In one example, the electric motor powers one or more wheels of the vehicle via sending an electrical load (e.g., electricity) to one or more traction motors coupled to one or plural axles of the vehicle.

The vehicle system may include a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage may divert airflow (e.g., from before the compressor inlet) away from the engine (or intake manifold of the engine) and to atmosphere. A compressor bypass valve (CBV) 142 may be positioned in the compressor bypass passage and may include an actuator that may be controlled by the controller to adjust the amount of intake airflow diverted away from the engine and to atmosphere.

Additionally, a wastegate 127 may be disposed in a bypass passage around the turbine, which may be adjusted, via actuation from the controller, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

Operation of the e-turbo may be adjusted in response to vehicle conditions to achieve a determined parameter. The e-turbo may supply power to at least one axle of the vehicle system. In one example, the e-turbo supplies power to only one axle of the vehicle system and the engine may supply power to the remaining axles. In one example, the e-turbo generates electricity to control a turbocharger speed and supplies the electricity to directly power at least one traction motor coupled to at least one axle. The alternator/generator may receive power from the engine and power plural traction motors, each traction motor coupled to a corresponding axle. During some conditions, it may not be desired to power the one axle via the e-turbo. The engine may provide power to all six axles during some conditions where the e-turbo speed exceeds a limit speed (e.g., a threshold turbocharger speed). However, operations described herein may prioritize use of the e-turbo such that the engine powers five axles and the e-turbo powers one axle. In one example, the limit speed is based on a determined speed of the turbo at or above a manufacturing tolerance of the turbo at which degradation may occur. The embodiments described herein may be applied to vehicles including more than six or less than six axles. For example, the vehicle may include four axles. Operation may include prophylactically avoiding conditions where the e-turbo does not power the at least one axle, which may prioritize use of the e-turbo. However, upon reaching a threshold, the wastegate may be opened and usage of the e-turbo reduced.

The vehicle system may further include a cooling system 150 (e.g., an engine cooling system). The cooling system may circulate coolant through the engine to absorb waste engine heat to distribute to a heat exchanger, such as a radiator 152 (e.g., a radiator heat exchanger). In one example, the coolant may be water, anti-freeze, or a mixture of the two. In another example, the coolant may be oil. A fan 154 may be further coupled to the radiator to maintain an airflow through the radiator when the vehicle is moving slowly or stopped while the engine is running. In some examples, a fan speed may be controlled by a controller 110. Coolant that is cooled by the radiator may enter a tank (not shown in FIG. 1). The coolant may then be pumped by a pump 156 back to the engine or to another component of the vehicle system.

The vehicle system may include an aftertreatment system 117 coupled in the exhaust passage downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In one example, an aftertreatment temperature sensor 115 is arranged at or upstream of an inlet of the aftertreatment system, which may measure a temperature of exhaust gas prior to entering the aftertreatment system. Additionally, one or more AFR sensors or oxygen ($O_2$) sensors may be arranged on an exhaust conduit upstream and/or downstream of the aftertreatment system. For example, an AFR sensor or $O_2$ sensor 181 may be arranged at the inlet of the aftertreatment system, which may estimate an AFR of the engine from the exhaust gas prior to entering the aftertreatment system, or an AFR sensor or $O_2$ sensor 182 may be arranged downstream of the aftertreatment system (e.g., at an exhaust pipe), which may estimate the AFR from exhaust gas exiting the aftertreatment system.

Catalysts are shown to exhibit a maximum (e.g., peak) NOx conversion at a particular exhaust gas temperature. As such, for minimizing vehicle emissions, it may be desirable to maintain temperatures within a range of temperatures near a peak conversion of the catalyst used in the exhaust gas aftertreatment system. For example, less than a determined amount of oxidation or conversion may occur at low exhaust gas temperatures (e.g., below approximately 120° C.). As a temperature of a catalyst in the aftertreatment system increases, the oxidation or conversion rates may increase. As the catalyst temperature is raised above a threshold temperature (e.g., 150° C.), the conversion rates may increase steeply with increasing temperature to maximum conversions rates (e.g., 90% for carbon monoxide (CO) and 70% for hydrocarbon (HC)). At high temperatures (e.g., 250° C.-350° C.), the catalyst performance stabilizes to form a characteristic plateau on the light-off curve. As such, it may be desirable, for minimizing vehicle emissions, to maintain exhaust gas temperatures above the plateau temperature, within a range in which typical exhaust gas aftertreatment systems exhibit near maximum conversion efficiency.

The vehicle system may include a low-pressure exhaust gas recirculation (EGR) system 185 coupled to the engine. The low-pressure EGR system may route exhaust gas from the exhaust passage of the engine to the intake passage upstream of the compressor. In some embodiments, the exhaust gas recirculation system may be coupled exclusively to a group of one or more donor cylinders of the engine (also referred to as a donor cylinder system). The vehicle system may further include a high-pressure EGR system 186 coupled to the engine. The high-pressure EGR system may route exhaust gas from the exhaust passage of the engine upstream of the turbine to the intake passage downstream of the compressor.

The controller may control various components and operations related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the vehicle (such as engine load, engine speed, brake torque, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, turbocharger speed, fueling quantity indicated by measured fuel system parameters, averaged mean-torque data, manifold pressure, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the turbine inlet temperature sensor 125, or the exhaust temperature entering the aftertreatment system, as determined from the inlet temperature sensor 115), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), the wastegate, or the like. Other actively operating and controlling actuators may be coupled to various locations in the vehicle.

Further, the controller may monitor an engine throttle setting. This may be performed for an engine governor. For example, the engine governor may react to the engine throttle setting in order to adjust engine operation. In one embodiment, the throttle setting may be infinitely adjustable. In another embodiment, an operator of the vehicle may adjust an input device between a plurality of determined engine notch settings. Based on the selected engine notch setting, the controller may adjust engine operation to provide the determined engine performance (e.g., such as a determined vehicle speed). An increase in the numerical value of the notch may correspond (directly or indirectly) with an increase in vehicle speed and/or with engine power output. It may adjust fuel injection timing and fuel rail pressure. For example, notch 0 may correspond to engine idle, notch 4 may provide a mid-level of engine speed, and notch 8 may be the maximum throttle setting. For example, the controller may adjust engine revolutions per minute (RPM), gearing, valve timings, and other parameters in order to move the vehicle at a speed corresponding to the selected engine notch. For example, the engine may be adjusted to generate more power in order to increase the vehicle speed, or to accommodate a heavy load (e.g., due to cargo and/or grade) at a lower vehicle speed.

Turning now to FIG. 2, it shows a first embodiment 200 of a turbine 202. The turbine may be used similarly to turbine 123 in the turbocharger arrangement 120 of FIG. 1. An axis system 290 is shown comprising three axes, namely an x-axis parallel to a horizontal direction, a y-axis parallel to a vertical direction, and a z-axis perpendicular to each of the x- and y-axes. The axes may be used as a reference to describe shapes and orientations of components of the turbine.

The turbine includes a turbine housing 204 which may shape an exhaust gas inlet 206. The exhaust gas inlet 206 may comprise a volute shape adapted to receive exhaust gas from an engine, such as engine 104 of FIG. 1. The volute shape of the exhaust gas inlet may distribute the exhaust gas around in a 360-degree manner to a turbine wheel (circle 209 indicates where a turbine wheel may be positioned within the turbine). The exhaust gas may rotate the turbine wheel, which may translate into rotation of a compressor wheel.

The turbine may have a plurality of vanes 210 arranged adjacent to and surround the turbine wheel, along a nozzle ring 208. Together, the nozzle ring and plurality of vanes may form a nozzle of the turbine (e.g., turbine nozzle), adapted to guide exhaust flow to the turbine wheel. The plurality of vanes may be printed onto the nozzle ring, in some examples, via additive manufacturing. Additionally or alternatively, the plurality of vanes may be assembled from a mold, machined, etc. The plurality of vanes may be fixed and stationary. For example, each vane may be stationary and not move (e.g., pivot, rotate, or translate) relative to the nozzle ring and a central axis 299 of the turbine wheel. Additionally, the plurality of vanes, inside the turbine may be actuated mechanically, hydraulically, pneumatically, and so on.

Actuation of the plurality of vanes may include actuating one or more of the vanes to a fully closed position, a fully open position, or a position therebetween. Additionally or alternatively, the plurality of vanes may be actuated in tandem. The fully closed position may block gas flow while increasing its velocity toward the turbine wheel, which may increase a turbine wheel speed at lower engine speeds or powers. The fully open position may minimize a hindrance caused by the vanes to the gas flow, which may be desired at higher engine speeds or powers when an exhaust mass flow is greater. In some examples, the fully open position may result in turbine lag at the lower engine speed and the fully closed position may excessively increase the turbine speed at higher engine speeds. Thus, adjustment of the plurality of vanes to positions between fully open and fully closed positions may fine-tune the gas flow such that a determined turbine wheel speed is achieved across a greater range of operating conditions.

The plurality of vanes may be arranged around an entire circumference of the nozzle ring, between the turbine wheel and the exhaust gas inlet. The plurality of vanes may be shaped to adjust a geometry of the turbine based on one or more engine conditions, such as an engine power level, the turbo speed, a manifold pressure, and exhaust temperature. The plurality of vanes may adjust a nozzle area of the turbine, which may modify a flow rate of exhaust gases flowing therethrough. In some examples, the flow rate of exhaust gases may be reduced to the turbine via the plurality of vanes, and this may decrease the turbo speed. In one example, the plurality of vanes may be used in combination with the wastegate. Alternatively, the wastegate may be omitted and the plurality of vanes may be the only element that can adjust exhaust gas flow to the turbine.

Turning now to FIG. 3A, it shows a high level flow chart illustrating a method 300 for adjusting operating conditions of the engine, the e-turbo, and the wastegate and/or vanes. Instructions for carrying out the method may be executed by a controller having a plurality of processors. The execution may be based at least in part on instructions stored on a memory of the controller and in conjunction with signals received from sensors of the engine system, such as the sensors described above with reference to FIG. 1. The controller may employ engine actuators of the engine system to adjust engine operation, according to the methods described below. Adjusting engine operation may include switching from one engine operating mode to another engine operating mode.

At step 302, the method may include determining a turbocharger speed target based on operating conditions. Operating conditions may include one or more of a torque, an engine power, a manifold pressure, and an exhaust gas temperature. In one example, the turbocharger speed target may be equal to the limit speed. Additionally or alternatively, the turbocharger speed target is equal to a turbocharger speed based on current operating parameters to provide and/or assist in meeting determined torque, engine power, wheel slip, and other values.

At step 304, the method may include determining if the turbo speed equal to the turbocharger speed target. If the turbo speed is equal to the turbocharger speed target, then at step 306, the method includes maintaining current operating parameters. Wastegate and/or vane positions may be maintained.

If the turbo speed is not equal to the turbocharger speed target, then at step 308, the method includes adjusting a turbocharger motor power target to meet the speed target. For example, if the turbocharger speed is higher than the speed target, then the power target may be reduced. As another example, if the turbocharger speed is lower than the speed target, then the power target may be increased. Adjusting power provided to the turbocharger to match the power target may include adjusting the wastegate, vanes, and/or generating off the turbocharger shaft via the electrical machine to power the at least one wheel.

At step 310, the method includes determining if power feedback is equal to the power target. If the power feedback is equal to the power target, then the method proceeds to step 306, as described above.

If the power feedback is still not equal to the power target, then at step 312, the method may include adjusting a position of the wastegate and/or the plurality of vanes to adjust the turbo speed. In one example, the position of the wastegate and the plurality of vanes may be adjusted sequentially based on a change of the turbo speed. For example, if adjusting the wastegate adjusts the turbo speed to turbocharger speed target, then the vanes may not be adjusted. For example, opening the wastegate may decrease the turbocharger speed. Adjusting the vanes to a more closed position may decrease the turbocharger speed.

At step 314, the method may include continuing to coordinate operating adjustments of the engine, e-turbo, and the wastegate/vanes until the turbocharger speed matches the turbocharger speed target. For example, once the turbo speed equal to the turbocharger speed target, operating parameters may continue to be monitored and adjustments executed to maintain the turbocharger speed matching its target.

In this way, a combination of the engine, the turbocharger, and the wastegate/vanes may be operated to reach determined parameters. The determined parameters may include a turbo speed and airflow. Coordination of the engine, the turbocharger, and the wastegate/vanes may reduce the turbo speed from exceeding the limit speed. Utilization of the e-turbo may be prioritized until a determined condition is reached, such as the likelihood exceeding the speed threshold. In one embodiment, the controller monitors the rate of change and begins to switch operating modes in anticipation of approach of an operating limit.

In some examples, the substitution rate may be adjusted in response to the turbocharger speed. In one example, the substitution rate may be reduced in response to the turbocharger speed approaching or exceeding the limit speed. As such, an amount of a secondary fuel may be reduced relative to an amount of a primary fuel. Additionally or alternatively, in some embodiments, the substitution rate may be increased if the turbocharger speed is approaching or exceeding the limit speed.

Figure 3B:
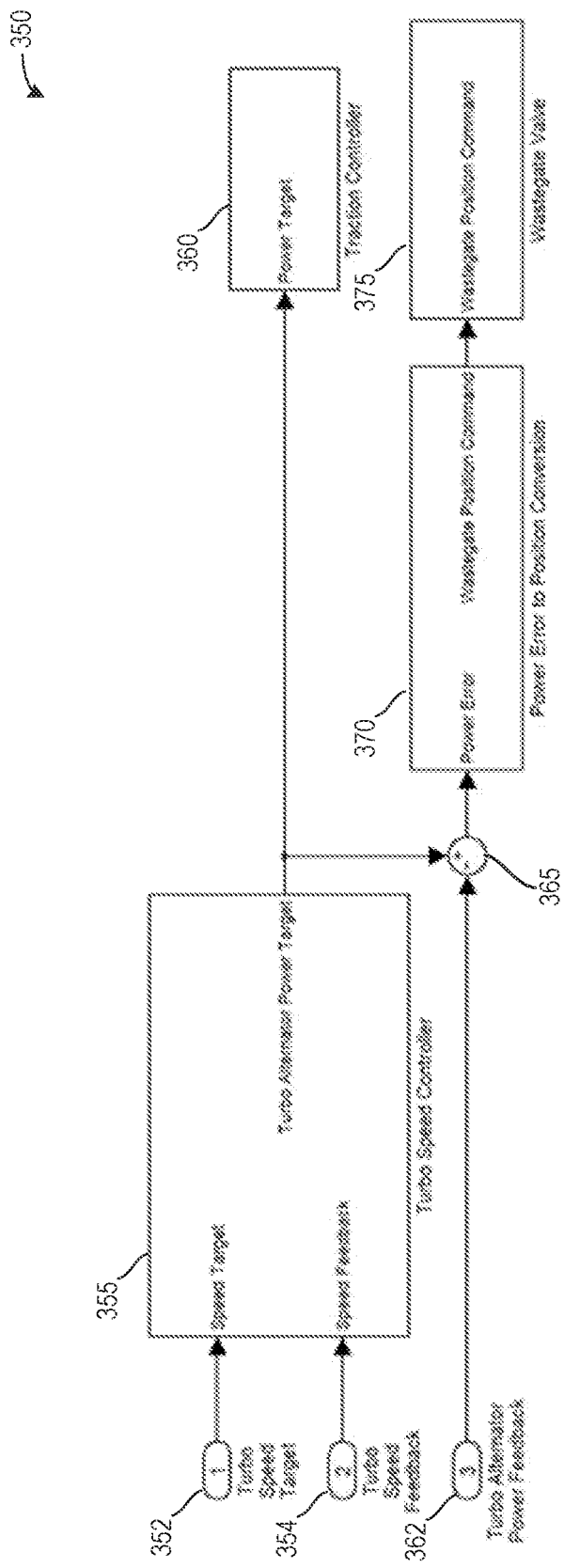
FIG. 3B shows a control diagram of the method of FIG. 3A.
Figure 4:
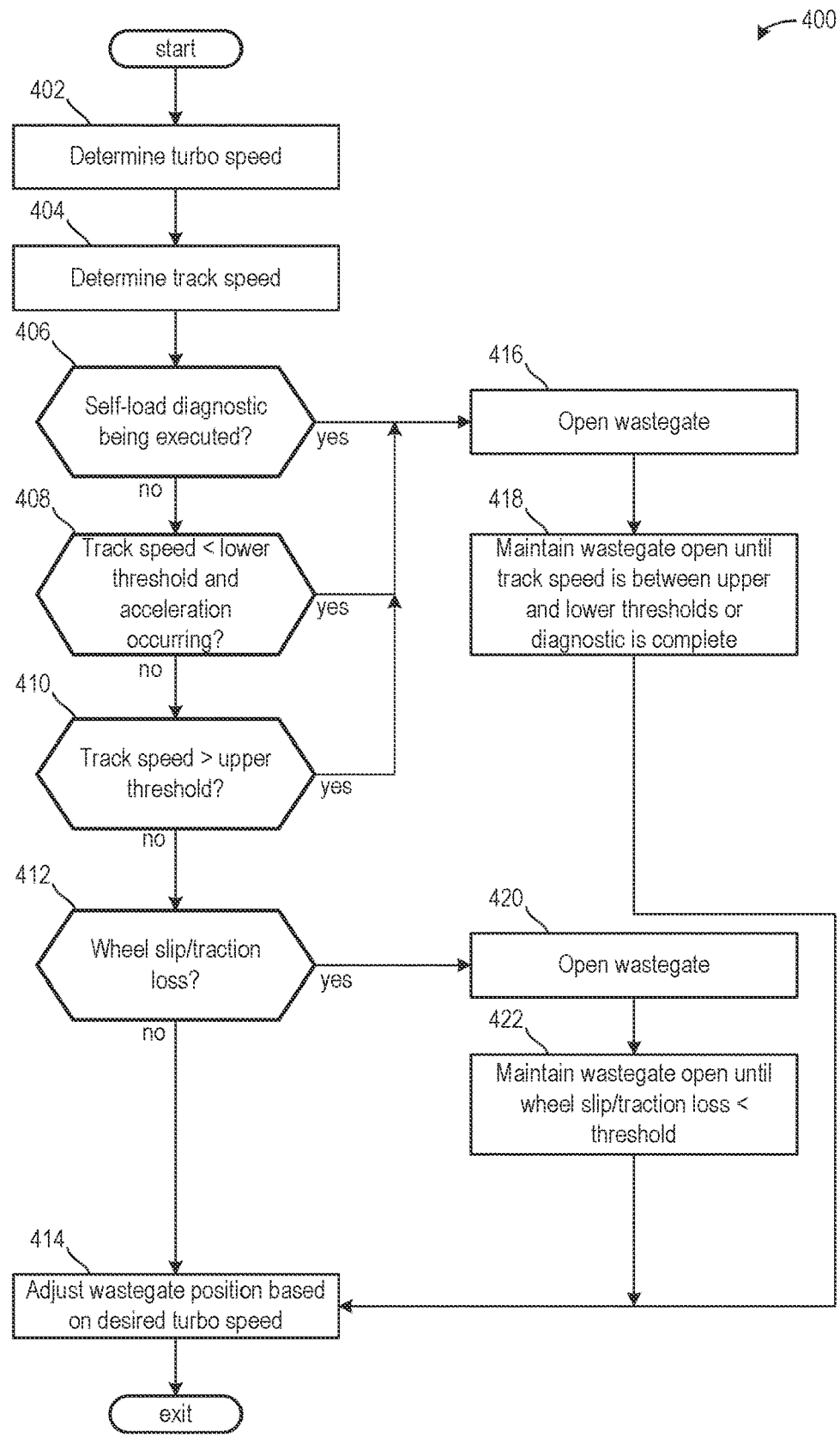
FIG. 4 shows a method for operating a turbocharger of the engine based on conditions.

Turning now to FIG. 3B, it shows a control diagram 350 illustrating inputs being provided to a turbocharger controller 355. The inputs may include a turbo speed target 352 and a turbo speed feedback 354. The turbo speed feedback may be provided by a speed sensor of the turbocharger. The turbo speed target may be based on current operating parameters as described above. The turbocharger controller may be a sub-controller of the controller 110 of FIG. 1. The turbocharger controller may determine a power target of the electrical machine (e.g., electrical machine 190 of FIG. 1; interchangeably referred to as a turbo alternator) based on the inputs. The turbocharger controller may output to a traction controller 360, wherein the traction controller receives the power target and drives at least one axle of the vehicle.

The turbocharger controller may provide the alternator power target to a comparator 365. The comparator may determine a power error based on a difference between the alternator power target and an alternator power feedback 362 provided to the comparator. The difference (e.g., a power error) is sent to a table 370. The table may convert the power error to a wastegate position command and/or a turbine vane position command. The wastegate position command is sent to a wastegate valve 375 and a position of the wastegate valve is adjusted based on the command.

Turning now to FIG. 4, it shows a method 400 for operating a wastegate of an e-turbo in response to different engine operating parameters and/or modes. At step 402, the method may determine a turbo speed. The turbo speed may be determined based on feedback from a speed sensor. The speed sensor may sense a speed of one or more of a turbine blade, a compressor blade, and a turbo shaft. Additionally or alternatively, the turbo speed may be estimated based on one or more of an exhaust temperature, a manifold pressure, an exhaust gas flow rate, and an intake manifold temperature. In one embodiment, the turbo speed may be determined based on the electric signature of the e-turbo motor.

At step 404, the method may include determining a track speed. In one example, the track speed may be equal to a vehicle speed determined via an acceleration sensor, a wheel speed sensor, and/or a speedometer. Additionally or alternatively, the track speed may be estimated based on an engine speed, a throttle position, and the exhaust gas flow rate.

At step 406, the method may include determining if a self-load diagnostic is being executed. The self-load diagnostic may be executed when the vehicle is parked. The engine may be run to standardize a repeatable, accurate, and concise process for load testing the vehicle. Engine performance may be tracked over a period of time, which may result in fuel savings and may enhance an operator efficiency by decreasing overall cycle time for the diagnostic. The load test may further decrease a maintenance cycle time and optimize labor to minimize fuel consumption. The load test may further decrease a cold-start duration. Brakes may reject power provided by the engine during the load test. However, power from the e-turbo may not be rejected. Thus, the wastegate may open when the self-load is being executed.

If the self-load diagnostic is not being executed, then at step 408, the method may include determining if a track speed is less than a lower threshold track speed. In one example, the lower threshold track speed is equal to zero. Additionally, the method may include determining if the vehicle is accelerating. During conditions where the vehicle speed is less than the lower threshold track speed, it may be undesirable to draw power from the e-turbo due to the e-turbo limiting the airflow to the engine and thereby limiting the power produced by the engine. If the vehicle speed is not less than the lower threshold vehicle speed and an acceleration is not occurring, then at step 410 the method may include determining if the track speed is greater than an upper threshold track speed.

The upper threshold track speed may be based on a track speed where power or voltage demands of the traction motor (e.g., the electric motor) are relatively high. When the power demand is relatively high, the e-turbo may not be able to extract a sufficient amount of power at a calculated voltage and current demands and the turbocharger may begin to overspeed. The e-turbo may not extract enough energy to meet the power demand at high track speeds due to one or more of voltage, current, and wheel speed.

If the track speed is not greater than the upper threshold track speed, then at step 412, the method may include determining if wheel slip or traction loss is occurring. In one example, wheel slip and/or traction loss may be estimated based on a wheel circumference and a distance traveled. As another example, additionally or alternatively, wheel slip may be determined as a percentage based on a number of rotations of the wheels to travel a fixed distance. Additionally or alternatively, wheel slip may be determined by comparing the number of rotations of one wheel with the number of rotations of one or more other wheels, wherein if wheel slip is detected, power draw from the e-turbo may not meet the power demanded by the traction motor to maintain power.

If wheel slip and/or traction loss is not occurring, then at step 414, the method may include adjusting the wastegate and/or turbine vane position based on a determined e-turbo speed. The determined e-turbo speed may be based on one or more of driver demand, engine load, exhaust mass flow rate, battery state-of-charge (SOC), and traction motor power demand. Additionally or alternatively, the wastegate may be omitted and a position of vanes of the turbine of the e-turbo may be adjusted to provide the determined e-turbo speed. In some embodiments, the e-turbo may include the wastegate and vanes, which may be adjusted in tandem to provide the determined e-turbo speed.

Returning to steps 406, 408, and 410, if one of the self-load diagnostics is being executed, the track speed is less than the lower threshold track speed, and/or the track speed is greater than the upper threshold track speed, then at step 416 the method may include opening the wastegate. As such, the e-turbo speed may decrease. In one example, the wastegate may be moved to a fully open position.

At step 418, the method may include maintaining the wastegate open until the track speed is between the upper and lower threshold track speeds or the diagnostic is complete. Once the track speed is between the upper and lower threshold track speeds and the diagnostic is complete, the wastegate may be actuated based on a determined e-turbo speed.

Returning to step 412, if wheel slip or traction loss is occurring then at step 420, the method may include opening the wastegate, similar to step 416 above. In one example, the wastegate is opened to the fully open position. Additionally or alternatively, a position of the plurality of vanes may be adjusted.

At step 422, the method may include maintaining the wastegate open until the percentage of wheel slip/traction loss is less than the threshold percentage. Once the percentage of wheel slip/traction loss is less than the threshold percentage, the wastegate may be operated based on a determined e-turbo speed. Additionally or alternatively, the vanes may be actuated to an open position until the percentage of wheel slip/traction loss is less than the threshold position. The vanes may then be operated based on the determined e-turbo speed. In some examples, additionally or alternatively, the vanes may be operated with the wastegate to control the percentage of wheel slip/traction loss.

In one example, if a wheel slip condition is present (e.g., based on a percentage of wheel slip exceeding a threshold percentage), the electric turbo may no longer power the at least one axle and the engine power may be distributed evenly to motors of all the axles. Additionally or alternatively, the engine may be unloaded in response to the wheel slip. The engine may drive all the axles of the locomotive for a determined duration of time. If wheel slip does not reoccur for the entirety of the determined duration of time, then the e-turbo may be activate and controlled to power at least one axle.

Additionally or alternatively, wheel slip may be determined based on a calculated electric turbo tractive torque dropping below a threshold tractive torque. In one example, the threshold tractive torque is based on an average tractive torque of all the axles. Additionally or alternatively, the threshold tractive torque may include a margin or other value based on an amount of tractive torque where torque was previously detected (e.g., via a sensor). The calculated electric turbo tractive torque may be based on a maximum torque achievable by the electric motor at the at least one axle. In one example, the wheel torque may be estimated based on electric power provided to traction inverters.

A technical effect of adjusting the position of the wastegate may be to mitigate turbine runaway (e.g., turbo speed exceeding the limit speed). The wastegate may be actuated in response to various parameters including engine power, turbo speed, manifold pressure, and exhaust temperature.

The disclosure provides support for a system including a turbocharger comprising a wastegate and an electric motor, the turbocharger being couplable to an engine, and a controller with computer-readable instructions stored on non-transitory memory thereof that when executed cause the controller to adjust an operational combination of the turbocharger and the wastegate to reach a determined operating parameter. A first example of the system further includes where the determined operating parameter is a turbocharger speed. A second example of the system, optionally including the first example, further includes where the instructions further cause the controller to adjust the turbocharger and wastegate to reach a determined airflow. A third example of the system, optionally including one or more of the previous examples, further includes where the instructions further cause the controller to adjust the wastegate to an open position in response to a turbocharger speed exceeding a limit speed. A fourth example of the system, optionally including one or more of the previous examples, further includes where the instructions further enable the controller to adjust engine operating parameters to limit conditions that increase the turbocharger speed above the limit speed and to prioritize use of the electric motor. A fifth example of the system, optionally including one or more of the previous examples, further includes where the turbocharger is configured to drive at least one axle of a vehicle comprising the engine, wherein the instructions further cause the controller to drive the at least one axle with the engine or the turbocharger or both the engine and the turbocharger. A sixth example of the system, optionally including one or more of the previous examples, further includes where the turbocharger is configured to generate electricity and to supply the electricity to an auxiliary load of a vehicle housing the engine.

The disclosure provides further support for a method including adjusting one or both of a wastegate position and a position of vanes to reach a determined rotational speed of a turbocharger. A first example of the method further includes where the turbocharger comprises an electric motor, and the method further comprising supplying electricity to, or a load on, the electric motor to control the speed of the turbocharger. A second example of the method, optionally including the first example, further includes where switching the wastegate to a fully closed position. A third example of the method, optionally including one or more of the previous examples, further includes where adjusting the wastegate position to an open position and the position of the vanes to an open position in response to a track speed being less than a lower threshold track speed or in response to a track speed being greater than an upper threshold track speed. A fourth example of the method, optionally including one or more of the previous examples, further includes where adjusting one or more of the wastegate position to a fully open position and the position of the vanes to a fully open position in response to a self-load diagnostic being executed. A fifth example of the method, optionally including one or more of the previous examples, further includes where adjusting one or more of the wastegate position to a fully open position and the position of the vanes to a fully open position in response to a percentage of wheel slip exceeding a threshold percentage. A sixth example of the method, optionally including one or more of the previous examples, further includes where sensing a wheel slip of a vehicle having plural axles, the vehicle comprising an engine with an alternator, and the turbocharger with an electric motor, powering at least one axle of the vehicle for a determined duration of time in response to a sensed wheel slip exceeding a threshold wheel slip value using the alternator coupled to the engine, and powering the at least one axle after the determined duration of time using power from the electric motor. A seventh example of the method, optionally including one or more of the previous examples, further includes where the adjusting is in response to determining one or both of a turbocharger speed and an engine power output.

The disclosure provides additional support for a system for a vehicle including a turbocharger couplable to an engine, an electric motor coupled to a shaft of the turbocharger; and a controller with computer-readable instructions stored on non-transitory memory thereof that when executed cause the controller to adjust one or both of a wastegate position and a position of vanes in conjunction with an operation of the turbocharger to reach a determined speed of the turbocharger in response to one or more of a track speed of the vehicle being less than a lower threshold value, the track speed being greater than an upper threshold, a loss of traction of wheels of the vehicle, and a rotational speed of the turbocharger exceeding a determined limit speed. A first example of the system further includes where the controller is configured to adjust a power output of the engine based at least in response to the speed of the turbocharger exceeding the determined limit speed. A second example of the system, optionally including the first example, further includes where the controller is configured to adjust one or both of the wastegate position and the position of the vanes at least partially in response to the engine operating in a self-load mode. A third example of the system, optionally including one or more of the previous examples, further includes where the track speed being less than the lower threshold further comprises where an acceleration is occurring. A fourth example of the system, optionally including one or more of the previous examples, further includes where the desired turbocharger speed is based at least in part on one or more of a driver power demand, an engine load, an exhaust mass flow rate, a battery state-of-charge (SOC), and a traction motor power demand.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
 a turbocharger comprising a turbine wheel, wastegate and an electric motor, the turbocharger being couplable to an engine configured to produce power, wherein the turbine wheel comprises a plurality of vanes coupled to a nozzle ring, and wherein the plurality of vanes is pivotably adjustable, between a fully open position and a fully closed position, along a central axis relative to the nozzle ring; and
 a controller comprising a non-transitory memory unit, configured to store instructions thereon, when executed cause the controller to:
  detect a wheel slip of an axle of a vehicle that is driven by the power produced by the engine;
  adjust operation of the turbocharger responsive to the wheel slip being detected, wherein the adjusted operation of the turbocharger comprises, when the wheel slip of the axle is detected, adjusting a wastegate position of the wastegate and pivotably adjusting the plurality of vanes relative to the nozzle ring until the wheel slip of the axle is less than a threshold percentage of wheel slip.

2. The system of claim 1, further comprising:
 a bypass valve coupled to a bypass passage, wherein the bypass valve comprises an actuator; and
 the instructions, when executed further cause the controller to:
  adjust the actuator of the bypass valve based on the wheel slip of the axle, wherein the actuator diverts an airflow into the bypass passage away from the engine.

3. The system of claim 1, wherein the instructions, when executed further cause the controller to:
 determine a target rotational speed of the turbocharger based on at least one of: determined torque, engine power, or the wheel slip of the vehicle, or a combination thereof.

4. The system of claim 3, wherein the instructions, when executed further cause the controller to:
 determine a rotational speed of the turbocharger;
 adjust a power target of the turbocharger based on comparing the rotational speed of the turbocharger to the target rotational speed of the turbocharger, wherein the adjusted power target increases or decrease the rotational speed of the turbocharger.

5. The system of claim 1, wherein the turbocharger is an e-turbocharger; and the instructions, when executed further cause the controller to: adjust the operation of the e-turbocharger and the position of the wastegate responsive to the wheel slip being detected, wherein the adjusted operation of the e-turbocharger supplies or extracts power to or from the e-turbocharger.

6. The system of claim 1, wherein the instructions, when executed further cause the controller to:
 adjust a substitution rate of relative amounts of different fuels for the engine, wherein the engine is a multi-fuel engine, wherein the adjusted substitution rate is based on a current engine load.

7. The system of claim 6, wherein the different fuels comprise at least one of: hydrogen fuel, ammonia fuel, or a combination thereof.

8. A method comprising:
 detecting a wheel slip of an axle of a vehicle having plural axles, the vehicle comprising an engine with an alternator, and a turbocharger with an electric motor and a wastegate, wherein the turbocharger comprises a turbine wheel further comprising a plurality of vanes coupled to a nozzle ring, and wherein the plurality of vanes is pivotably adjustable, between a fully open position and a fully closed position, along a central axis relative to the nozzle ring; and
 adjusting operation of the turbocharger responsive to the wheel slip being detected, wherein the adjusted operation of the turbocharger comprises, when the wheel slip of the axle is detected, adjusting a wastegate position of the wastegate and pivotably adjusting the plurality of vanes relative to the nozzle ring until the wheel slip of the axle is less than a threshold percentage of wheel slip.

9. The method of claim 8, further comprising:
 determine a target rotational speed of the turbocharger based on at least one of: determined torque, engine power, or the wheel slip of the vehicle, or a combination thereof.

10. The method of claim 9, wherein the adjusted operation of the turbocharger is further comprising: adjusting one or both of the wastegate position of the wastegate of the turbocharger and the position of the plurality of vanes of the turbocharger to reach the target rotational speed of the turbocharger.

11. The method of claim 10, further comprising:
 adjusting the wastegate position of the wastegate to a fully closed position.

12. The method of claim 10, further comprising:
 adjusting the wastegate position to an open position and the position of the plurality of vanes to an open position based on: a track speed being less than a lower threshold track speed or the track speed being greater than an upper threshold track speed.

13. The method of claim 10, further comprising:
   determining a rotational speed limit of a rotational speed of the turbocharger;
   adjusting a power output of the engine based at least in response to the rotational speed of the turbocharger exceeding the rotational speed limit.

14. The method of claim 10, further comprising: adjusting one or more of the wastegate position to a fully open position and the position of the plurality of vanes to a fully open position in response to a percentage of the wheel slip exceeding the threshold percentage of wheel slip.

15. The method of claim 8, further comprising: supplying power to the electric motor to control a rotational speed of the turbocharger.

* * * * *